US008549643B1

(12) United States Patent
Shou

(10) Patent No.: US 8,549,643 B1
(45) Date of Patent: Oct. 1, 2013

(54) USING DECOYS BY A DATA LOSS PREVENTION SYSTEM TO PROTECT AGAINST UNSCRIPTED ACTIVITY

(75) Inventor: Darren Shou, San Diego, CA (US)

(73) Assignee: Symantec Corporation, Mountain View, CA (US)

(*) Notice: Subject to any disclaimer, the term of this patent is extended or adjusted under 35 U.S.C. 154(b) by 72 days.

(21) Appl. No.: 13/066,013

(22) Filed: Apr. 4, 2011

Related U.S. Application Data

(60) Provisional application No. 61/320,609, filed on Apr. 2, 2010.

(51) Int. Cl.
*G06F 11/00* (2006.01)

(52) U.S. Cl.
USPC ............ 726/23; 726/22; 726/24; 726/25; 709/206; 455/410; 714/43

(58) Field of Classification Search
USPC ......... 713/188; 726/22, 23, 25, 24; 709/206; 455/410; 714/43
See application file for complete search history.

(56) References Cited

U.S. PATENT DOCUMENTS

| 7,441,180 | B1* | 10/2008 | Kaczmarek et al. | 715/201 |
|---|---|---|---|---|
| 2005/0172174 | A1* | 8/2005 | Taylor et al. | 714/43 |
| 2006/0168017 | A1* | 7/2006 | Stern et al. | 709/206 |
| 2006/0194568 | A1* | 8/2006 | Sharony | 455/410 |
| 2007/0289018 | A1* | 12/2007 | Steeves et al. | 726/24 |
| 2008/0208935 | A1* | 8/2008 | Palliyil et al. | 707/204 |
| 2009/0019547 | A1* | 1/2009 | Palliyil et al. | 726/25 |
| 2009/0241191 | A1* | 9/2009 | Keromytis et al. | 726/23 |
| 2010/0269175 | A1* | 10/2010 | Stolfo et al. | 726/22 |
| 2012/0084866 | A1* | 4/2012 | Stolfo | 726/25 |

* cited by examiner

*Primary Examiner* — Beemnet Dada
*Assistant Examiner* — Sayed Beheshti Shirazi
(74) *Attorney, Agent, or Firm* — Lowenstein Sandler LLP

(57) ABSTRACT

A computing device executing a data loss prevention (DLP) system tracks bait data on at least one of the computing device or a network. The DLP system identifies a potential security threat in response to detecting unscripted activity associated with the bait data. The DLP system performs an action in response to identifying the potential security threat.

19 Claims, 11 Drawing Sheets

USING DECOYS BY A DATA LOSS PREVENTION SYSTEM TO PROTECT AGAINST UNSCRIPTED ACTIVITY

RELATED APPLICATIONS

This patent application claims the benefit under 35 U.S.C. §119(e) of U.S. Provisional Application No. 61/320,609, filed Apr. 2, 2010, which is herein incorporated by reference.

FIELD OF THE INVENTION

Embodiments of the invention relate to the field of processing data, and more particularly, to creating decoy traffic (e.g., decoy documents and decoy inputs) to prevent loss of sensitive data.

BACKGROUND OF THE INVENTION

Data loss prevention defenses to date have focused on identifying technical tell-tale signs (byproducts) of stealthy operation by adversaries, such as modification of kernel data structures and code, anomalous network or process activity, etc. Due to the complexity of today's systems, attackers are presented with numerous opportunities to remotely control a targeted device, often on a sustainable basis and occasionally with the assistance of unsuspecting legitimate users.

Given the emphasis placed on protecting the perimeter of networks, through air-gaps, physical access control, and high assurance cross-domain guards, once attackers reach the relatively weaker inside of an enterprise's network, they can do tremendous damage, particularly if undetected for long periods of time as is often the case with insider threats. Thus, some enterprises use honeypots (traps) in an attempt to detect threats. However, the critical fundamental limitations of honeypots are their low lure factor in drawing in more sophisticated threats, and their lack of realism or believability as an environment worth targeting.

SUMMARY OF THE INVENTION

A method and apparatus for the creation, distribution and tracking of decoy documents that will identify malicious activity where other technical means cannot detect them is described. In one embodiment of the invention, a computing device executing a data loss prevention (DLP) system tracks bait data on a network and/or on the computing device. The computing device identifies a potential security threat in response to detecting unscripted activity associated with the bait data. The computing device performs an action in response to identifying the potential security threat.

In one embodiment, the unscripted activity comprises at least one of an attempt to exfiltrate the bait data or an attempt to intercept the bait data. In one embodiment, the computing device tracks network traffic that includes the bait data. The computing device then identifies the potential security threat by the DLP system in response to determining that at least one of the network traffic or the bait data deviates from expected values.

In one embodiment, detecting the unscripted activity comprises generating a fingerprint of at least a portion of the bait data, comparing the fingerprint to a plurality of previously generated fingerprints, and determining that the fingerprint matches one of the plurality of previously generated fingerprints. In one embodiment, performing the action comprises identifying one or more properties of the bait data, generating decoy traffic that includes additional bait data that has the one or more properties, and releasing the decoy traffic. In on embodiment, identifying the potential security threat comprises detecting an operation on the bait data using at least one of exact data matching, indexed document matching or described content matching and determining that the detected operation is a scripted operation.

In one embodiment, a computer readable medium includes instructions that will cause a processor that executes the instructions to track data on a network and/or on a computing device. The instructions further cause the processor to identify a potential security threat in response to detecting an unscripted activity associated with the bait data. The instructions further cause the processor to perform an action in response to identifying the potential security threat.

In one embodiment, a method for protecting data comprises executing a data loss prevention (DLP) system that tracks data on a network and/or computing device, identifying a potential security threat in response to detecting unscripted activity associated with the bait data, and performing an action in response to identifying the potential security threat.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
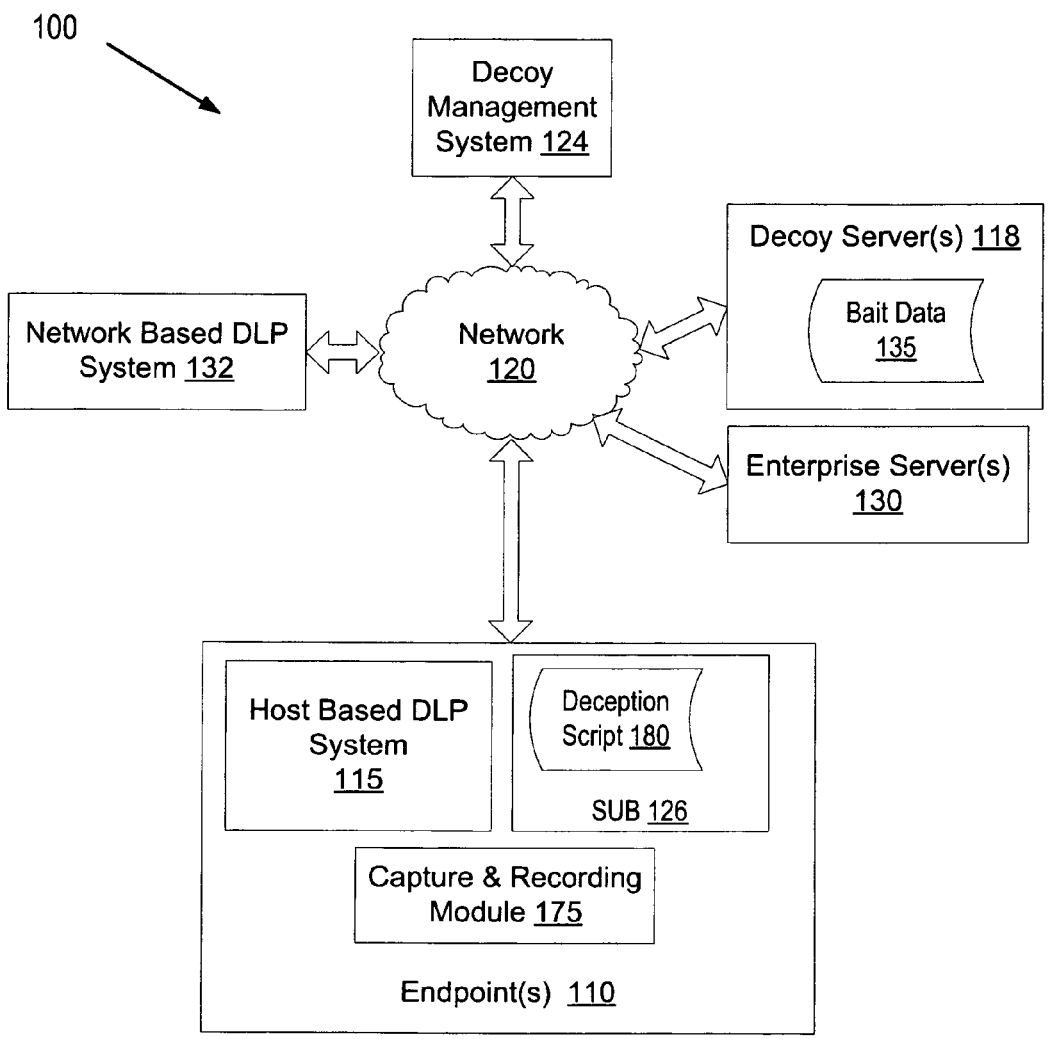
FIG. 1 illustrates an exemplary network architecture, in which embodiments of the present application may operate.

A method and apparatus for creating, distributing and tracking decoy traffic and bait data for data loss prevention is described. In one exemplary method of one embodiment, a computer system creates decoy traffic that includes bait data and causes the decoy traffic and bait data to be used in data loss prevention.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "tracking", "identifying", "performing", "generating", "monitoring" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Embodiments of the present invention provide a distributed trap-based defense for detecting malicious threats (e.g., intruders, malware, etc.) attempting to propagate quietly throughout any network, including closed enterprise and governmental networks. In accordance with embodiments of the present invention, an integrated architecture for the creation, distribution and tracking of decoys that will identify malicious activity where other technical means have not or cannot detect them is provided. In one embodiment, this includes the development of realistic, self-consistent communications (e.g., email threads and IM conversations) that will present attractive targets to stealthy adversaries, and the integration of a decoy architecture within an enterprise network and in particular with existing commercial Data Loss Prevention (DLP) technologies. By automating the creation of large volumes of decoys (e.g., sensitive looking documents and other bait data), adversaries are presented with a wealth of decoy targets. These decoys can be tracked within the enterprise by a network based DLP system and/or host based DLP systems, with early warning of access and exfiltration provided to administrators. Bait data (such as false credentials) may further entice adversaries to access tempting systems and services with such credentials, providing a secondary form of detection and attribution.

Therefore, embodiments of the present invention enable the detection of sophisticated adversaries who have infiltrated a computer system or network, independent of the technical means used to achieve such infiltration. Against cautious adversaries who are aware of the use of decoys, embodiments of the present invention will still serve to confuse and divert efforts towards discriminating true data from bait data, slowing down operations and increasing the likelihood of detection through other, complementary means.

FIG. 1 illustrates an exemplary network architecture 100, in which embodiments of the present application may operate. The network architecture 100 may include endpoints 110 connected together and to enterprise servers 130 via a network 120. The network 120 may be a public network (e.g., the Internet), a private network (e.g., a local area network (LAN) or wide area network (WAN)), or a combination of a public network and private network. Network 120 may be the network of an enterprise, and may also include such devices as network printers, switches, routers, gateways, firewalls, or any other devices having a network address. In one embodiment, the network architecture 100 further includes a network based data loss prevention (DLP) system 132, a decoy management system 124, and one or more decoy servers 118 connected to network 120.

Endpoints 110 may be laptop computers, desktop computers, mobile phones, personal digital assistants (PDAs), or other endpoint computing devices connected to network 120. Alternatively, endpoints 110 may be virtual machines. Some endpoints 110 are associated with (e.g., used by) real users. Other endpoints 110 are used by surrogate user bots (SUBs) 126. An SUB 126 is an application or program (or collection of applications) that simulates a real user. The SUB 126 may run within an OS installed on the endpoint 110 or on a hypervisor that hosts a virtual machine that includes the OS. Each SUB 126 may be associated with a particular fictional user (e.g., a fictional employee of the enterprise). The SUB 126 may have a decoy account (e.g., for access to the enterprise servers and/or decoy servers), decoy credentials, a fictional job role in a fictional employment hierarchy, etc. This information may be discovered by parties looking to learn more about their environment through inappropriate means such as sniffers, spyware, keyboard loggers, rootkits, and other such techniques.

An SUB 126 executes a deception script 180 to emulate a real user. Execution of the deception script 180 causes the SUB 126 to generate keyboard inputs, mouse inputs, commands to launch programs, commands to send emails, commands to access web sites (surf the web), and so forth. A deception script 180 may, for example, cause a SUB 126 to type and send email messages (e.g., to other SUBs), post blog entries on decoy web sites, write decoy files, etc. SUBs 126 may interact with other SUBs 126 and/or with real users according to pregenerated deception scripts 180 to intentionally expose the SUBs 126 to be discovered by anyone monitoring the endpoint 110 and/or network 120 via inappropriate means.

Some endpoints 110 may be used by both SUBs 126 and real users. Such use of an endpoint 110 by a real user and by an SUB 126 may be concurrent (e.g., simultaneous) or may be sequential. Accordingly, endpoints 110 operated by SUBs 126 should be indistinguishable from user controlled endpoints.

Each endpoint 110 may include a host based data loss prevention (DLP) system 115. Each host based DLP system 115 protects an endpoint 110 from data loss. Host based DLP system 115 may monitor execution of the deception scripts 180 for unscripted behavior, which may indicate the presence of malware or an intruder. Host based DLP system 115 may additionally monitor for changes in decoy files or other decoy documents, for attempts to exfiltrate bait data (move the bait data out of the network 120), etc. In one embodiment, when a host based DLP system 115 detects a potential threat, it performs one or more actions to protect sensitive data. For example, host based DLP system 115 may protect endpoint 110 by restricting access to sensitive data stored on local storage and/or on network storage (e.g., provided by an enterprise server 130). Alternatively, host based DLP system 115 may simply track programs and/or users that access bait data. The host based DLP systems 115 may notify network based data loss prevention system 132 of suspect activity.

In one embodiment, endpoints 110 include a capture and recording module 175 that records all user inputs and actions, such as keyboard inputs, mouse inputs, application launches, email generation, instant message (IM) conversations, document drafting, and so on. All of this information may be recorded to generate a corpus of training data. The training data may then be used by decoy management system 124 to generate deception scripts 180.

Each of the network based DLP system 132, decoy management system 124, enterprise servers 130 and decoy servers 118 may include one or more computing devices such as, for example, a desktop computer, laptop computer, server computer, etc. configured to perform designated tasks. Each of these components of the network architecture 100 may include one or more processing devices, memory, data stores, etc. Additionally, each of these network components may be a single machine or multiple machines, which may be arranged in a cluster.

Enterprise servers 130 provide services to endpoints 110 on network 120. Examples of enterprise servers 130 include storage servers that provide network storage, email servers that handle incoming and outgoing email traffic, web servers, and so forth.

Decoy servers 118 mimic enterprise servers 130, but contain only or primarily bait data 135. For example, network architecture 100 may include an enterprise email server and a decoy email server. A decoy server 118 may be a decoy web server, decoy storage server, decoy email server, or other type of decoy server. The decoy server 118 may include one or more decoy accounts, web pages, documents, etc. that, when accessed, alert the network based DLP system 132 of a network intrusion. Preferably, decoy servers 118 will be inaccessible and/or transparent to legitimate users to avoid confusion.

An enterprise server 130 may also act as a decoy server, and may thus store both bait data and real operational data. Preferably the bait data and real operational data are stored in such a manner to avoid polluting the real operational data with the bait data. For example, real operational data and bait data may be separated based on workgroup, workspace, cost center, team, etc. Examples of shared workspaces include shared file servers and shared image servers for which user level access control permissions offer appropriate separation. Other examples include terminal servers separately rendering pages to users and SUBs, local drives that are shared between SUBs or shared between legitimate users, and search engines which either search legitimate user content or SUB content.

Network based DLP system 132 protects sensitive data that is at rest and/or in transit on network 120. Additionally, network based DLP system 132 detects attempts to access and/or exfiltrate bait data and decoy documents. Network based DLP system 132 may protect data that is present on network storage and/or data that is present on storage devices of individual endpoints 110. Network based DLP system 132 may also protect data that is included in email messages, in instant messages, that is uploaded to web sites, or that is otherwise to be transferred out of the network 120. The network based DLP system 132 in one embodiment includes a network appliance that is configured to enforce DLP policies on network 120.

Network based DLP system 132 may scan network traffic to identify bait data, deviations in decoy traffic, sensitive information, changes in decoy files or other decoy documents, attempts to exfiltrate bait data, etc. Network based DLP system 132 may also monitor bait data and decoy documents stored at rest on network storage. In one embodiment, network based DLP system 132 operates in conjunction with host based DLP systems 115, exchanging messages with such host based DLP systems 115 regarding perceived threats and incidents. For example, network based DLP system 132 may receive a notification that a potential threat has been detected by a host based DLP system 115. Network based DLP system 132 may also send notifications to one or more host based DLP systems 115 in response to detecting potential threats.

Decoy management system 124 creates, distributes and manages decoy servers 118, SUBs 126, decoy traffic, deception scripts 180, etc. In one embodiment, decoy management system 124 generates a series of deception scripts 180 (e.g., based on training data captured by capture and recording modules 175) and provides these deception scripts 180 to SUBs 126 distributed on endpoints across the network 120. Decoy management system 124 may also distribute copies of the deception scripts 180 to network based DLP system 132 to facilitate detection of intruders attempting to access or exfiltrate decoy documents and bait data.

Figure 2:
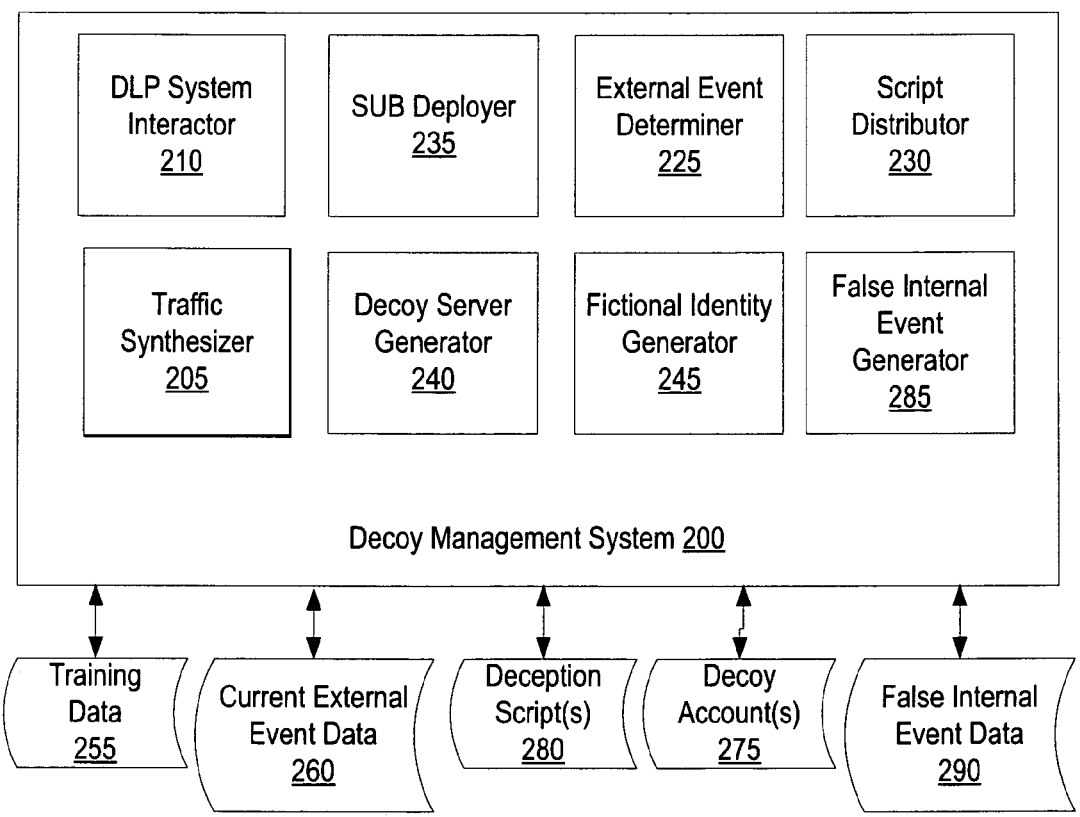
FIG. 2 is a block diagram of a decoy management system, in accordance with one embodiment of the present invention.

FIG. 2 is a block diagram of a decoy management system 200, in accordance with one embodiment of the present invention. In one embodiment, decoy management system 200 corresponds to decoy management system 124 of FIG. 1. In one embodiment, decoy management system 200 includes a traffic synthesizer 205, a DLP system interactor 210, a script distributor 230, a decoy server generator 240, a SUB deployer 235, an external event determiner 225 and a fictional identity generator 245.

External event determiner 225 gathers information on current external events and then categorizes the information. Current external event data 260 may then be stored in a data store, which may be a database or a file system. An external event is an event that is external to (e.g., not associated with) an enterprise being protected by the decoy management system 200. Examples of external events include wars, natural disasters, stock reports, celebrity gossip, political news, and so forth.

In one embodiment, external event determiner 225 crawls news web sites, filters news from non-news, categorizes stories, and then clusters stories within categories by event. During this process, multiple news stories on the same event are grouped together. At the top level, text categorization based on a set of training data may be used to group articles into broad topics (e.g., US, World, Finance, Entertainment, and Sports). Clustering may then be used to group articles into events (i.e., a set of articles on the same event). The same clustering algorithm may be used to group related events together. In one embodiment, this process is data driven, with no pre-determined set of categories. Alternatively, a predetermined set of categories may be used. The external event determiner 225 may allow a user to specify keywords that will be used in selecting events for summarization (such as "Al-Qaeda" or "Arab street"). Additionally, the external event determiner 225 may generate a list of typed keywords (locations, people, organizations, etc.) that characterize all news stories of current interest. These external events may then be used to replace references to external events in training data (explained below). In one embodiment, Newsblaster™ of Columbia University is used to determine current external events.

In one embodiment, false internal event generator 285 generates false internal events 290. These may include pretend meetings between fictional individuals (e.g., between SUBs), pretend product releases, fictional projects, etc. The false internal event data 290 may be generated by modifying internal events included in the training data. If the training data 255 was based on the activity of employees of the enterprise that is being protected by the decoy management system 200, then these modified internal events will be very realistic and believable.

Traffic synthesizer 205 generates decoy traffic and generates scripts for releasing the decoy traffic onto an enterprise's network. Decoy traffic will include both a set of content created and transformed within endpoint devices, and also decoy network traffic caused by the exchange of decoy emails, decoy IMs, etc. Ideally, human readers and computerized readers should not be able to differentiate between actual user generated traffic and decoy traffic. In one embodiment, traffic synthesizer 205 generates decoy traffic based on performing machine learning (or other mathematical modeling) using a corpus of actual user generated traffic included in training data 255 that has been gathered by capture and recording modules included in endpoints. Alternatively, or in addition, a corpus of training data 255 may be provided (e.g., by a supplier of the network based DLP system). Traffic synthesizer 205 generates a copy of the corpus of training data 255 and modifies the copy by changing temporal references, changing references to external events, changing references to internal events, etc. of emails, IMs, documents, blogs, etc. included in the training data 255.

In one embodiment, traffic synthesizer 205 does not expose information in any new environments, and does not expose any information that was not already previously exposed on the network when generating the decoy traffic. Additionally, traffic synthesizer 205 may provide decoy traffic and bait data that is tailored to the specific organization wishing to defend itself. This provides realism in decoy traffic and bait data that is lacking from conventional honeypots.

Traffic synthesizer 205 generates deception scripts 280 for a collection of SUBs based on the synthesized decoy traffic. Decoy management system 200 determines whether any SUBs associated with deception scripts (e.g., SUBs that will execute the deception scripts) are not yet in existence. If this is the case, then fictional identity generator 245 creates a new fictional identity that will be used by a SUB. This may include generating a decoy account for the fictional identity, generating decoy credentials, adding an entry for the fictional identity to a payroll system, and so forth.

SUB deployer 235 may configure a new SUB with the decoy account information, decoy credentials, etc., and may deploy the SUB to a designated endpoint. Alternatively, SUB deployer 235 may reconfigure an already deployed SUB to cause that SUB to assume a role of a new fictional identity.

Script distributor 230 distributes the deception scripts 280 to those SUBs that will be executing the scripts. A unique deception script 280 may be generated for, and transmitted to, each SUB. A particular deception script may cause a SUB executing the script to turn on or off a virtual machine, write and transmit emails to other SUBs, post blog entries to decoy blogs hosted by decoy servers, initiate decoy IMs with other SUBs, write decoy documents, and so forth.

Decoy server generator 240 generates and/or configures decoy servers. This may include generating decoy web servers for SUBs to post blog entries to, to post wiki updates to, to log into with decoy credentials, etc. This may additionally include generating decoy file servers that contain decoy files having bait data such as trade secret documents, patient records, credit card information, social security numbers, credit card numbers, and so forth. Other types of decoy servers may also be generated and/or configured. In one embodiment, decoy server generator 240 generates decoy sections in real servers. For example, a decoy blog may be added to a real server, or a decoy file share may be added to a real storage server.

DLP system interactor 210 exchanges communications with a network based DLP system and/or host based DLP systems. In one embodiment, DLP system interactor 210 sends copies of deception scripts 280 to DLP systems. The DLP systems may then use the deception scripts to enforce DLP policies to detect intruders.

In one embodiment, DLP system interactor 210 receives incident reports and/or intrusion alerts from one or more DLP systems. The incident reports and intrusion alerts may identify when suspect activity was detected, the nature of the suspect activity, the type of bait data that the suspect activity operated on, the type of decoy document that the bait data was attached to, etc. DLP system interactor 210 may provide the incident reports and/or intrusion alerts to the traffic synthesizer 205. The traffic synthesizer 205 may then create additional targeted decoy traffic based on the received incident reports/intrusion alerts and based on the corpus of training data. In one embodiment, the traffic synthesizer 205 analyzes the received incident reports to determine properties of the bait data and/or the decoy traffic that was operated on by an intruder. The traffic synthesizer 205 may then generate additional bait data that shares properties with the bait data identified in the incident reports. Traffic synthesizer also generates additional decoy documents and inserts the new bait data into the additional decoy documents. The additional decoy documents may be coherent with existing decoy documents that the intruder has already infiltrated/operated on. For example, if the intruder copied bait data from an email message, a response email message may be generated and sent that includes additional bait data of a similar type. Accordingly, the decoy management system 200 can generate bait data that is of a type that an intruder is interested in to further lure the intruder, and can place the new bait data onto the system in a manner that is not suspect.

Figure 3:
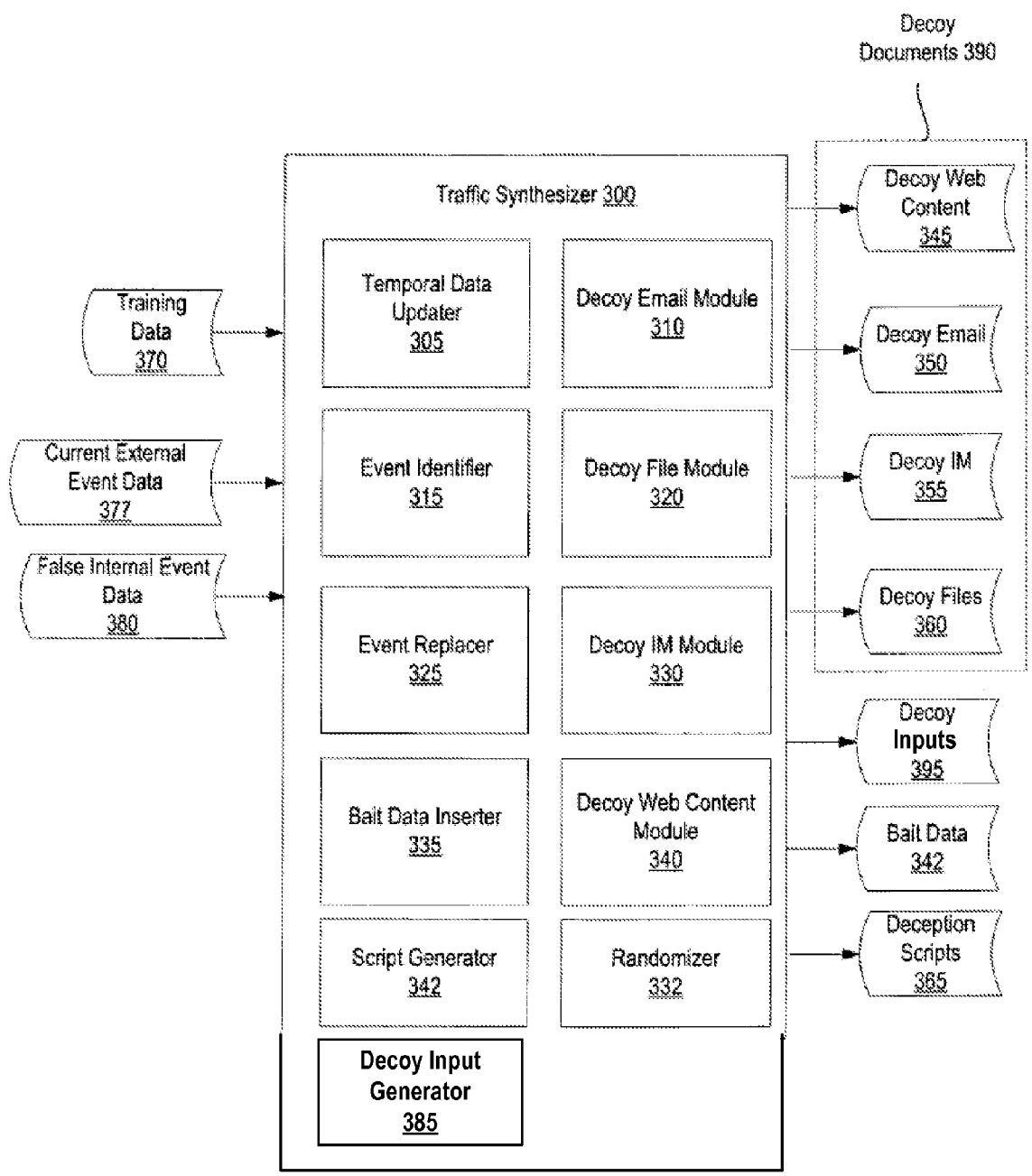
FIG. 3 is a block diagram of a traffic synthesizer, in accordance with one embodiment of the present invention.

FIG. 3 is a block diagram of a traffic synthesizer 300, in accordance with one embodiment of the present invention. Traffic synthesizer 300 in one embodiment corresponds to traffic synthesizer 205 of FIG. 2. Traffic synthesizer 300 may generate multiple different types of decoy traffic, and may generate deception scripts for releasing the decoy traffic. In one embodiment, traffic synthesizer 300 includes a temporal data updater 305, an event identifier 315, an event replacer 325, a bait data inserter 335, a randomizer 332 and a script generator 342.

Decoy traffic may be indistinguishable from, or at least plausibly resemble, real traffic (e.g., real email exchanges, real IMs, web access, etc.). Decoy traffic may be roughly divided into decoy documents 390 and decoy inputs 395. Decoy inputs 395 include decoy keyboard inputs, decoy mouse inputs, decoy mounting of a CD or DVD, decoy commands to execute applications and/or control applications, and so on. Decoy documents 390 include decoy files (e.g., word processor documents, spreadsheets, pdfs, images, etc.), decoy emails, decoy instant messages, decoy web posts (e.g., blog or wiki posts), and so forth. An SUB performing decoy inputs 395 according to a deception script 365 may generate decoy documents 390. For example, an SUB executing a deception script 365 may perform multiple decoy mouse inputs and keyboard inputs, which may ultimately cause, for example, a decoy email to be generated and transmitted to another SUB.

To create realism for decoy documents 390, traffic synthesizer 300 controls content of the decoy documents 390 (both the range of topics and the particular factual details). To create decoy documents 390 and decoy inputs 395, traffic synthesizer 300 transforms real traffic from training data 370 into decoy traffic free of tell-tale temporal or other tip-offs (e.g., references to past dates in a future tense). Additionally, most dynamic content will link to other content. Accordingly, traffic synthesizer 300 records and maintains links between decoy documents in accordance with linked content from the training data 370.

Temporal data updater 305 identifies and transforms temporal references from training data. When recycling existing email threads, IMs, files, etc., temporal references should be changed to reflect the time of deployment. Temporal references include references to absolute dates in myriad formats, relative dates and temporal expressions, and events fixed in time to specific dates. Each of these temporal aspects should be updated. For example, absolute dates can appear in any of many formats such as January 23, Feb 14, 3/17, May, 7/4, 02/03/04, or 05-Jan-06, and large user bases are rarely consistent in the formats which they use to refer to dates, particularly in informal correspondence such as email and other messaging. Furthermore, it is clear that 3/17 most likely refers to a March 17, but it is not absolutely clear whether 7/4 refers to a July 4 or an April 7, and it is less clear whether Feb. 3, 2004 refers Feb 3 in 2004, March 2 in 2004, April 3 in 2002, or March 4 in 2002. Even 5-Jan-06 could be January 5 of 2006 or January 6 of 2005. To compound things, April is a popular first names, and may and march may also be used as verbs.

In one embodiment, temporal data updater 305 includes multiple rules and/or statistical models for identifying temporal references within training documents. These rules and/or statistical models may be established and/or updated using machine learning techniques. In one embodiment, the temporal data updater 305 uses BBN's IdentiFinder™ to identify temporal references in the training data and to ground them in an absolute reference.

Once temporal references are identified, temporal data updater 305 replaces those temporal references with new temporal references in the decoy documents. Temporal data updater 305 may include multiple rules and/or statistical models for temporal data replacement. These rules/models may have been generated using machine learning from examples for how individuals refer to dates in multiple different environments and for multiple different types of documents. Decoy documents 390 may include multiple different temporal references to future events, past events, etc. Temporal data updater 305 ensures that consistency of event times is maintained throughout the many different formats and phrases used for temporal references, as well as throughout linked decoy documents.

Event identifier 315 identifies internal events and external events referenced in the training data. Internal events such as meetings should be addressed separately from external events observed by and discussed within enterprises or governments. Accordingly, in one embodiment, event identifier 315 distinguishes between internal events and external events.

To separate identified events into internal events and external events, event identifier 315 uses one or more event models. In one embodiment, the event models are generated using machine learning. The event models may categorize events as internal events or external events based on language surrounding the event description, whether individuals outside of the enterprise participated in the events, whether references to the event can be found in external sources, and so on.

In one embodiment, event identifier 315 recognizes which text spans in training documents (e.g., recorded emails, IMs, files, etc.) discuss primarily material that is also discussed outside of the training data (e.g., outside of the enterprise from which the training data was taken). For example, an email may refer to an earthquake at a particular location, and external sources may show conversation of the same earthquake. Such events may be identified as external events. Additionally, events released to individuals outside of the enterprise would be expected to be externally visible, and may be classified as external events. Furthermore, event identifier 315 may assume that any event involving participation of individuals outside enterprise are externally visible, and thus classify such events as external events.

In one embodiment, event identifier 315 analyzes the language surrounding the event description to classify the event. For example, internal events may correlate with the use of first and second person pronouns, which are rare when talking about external events (except in quotes). These and other rules may be used to identify and distinguish between internal and external events. Event identifier 315 may identify references to external events which are embedded in text spans about internal events, and separately identify the internal event and the embedded external event.

Event replacer 325 replaces identified internal events and external events with mock internal events and current external events, respectively. In one embodiment, event replacer 325 replaces identified external events with current external events from current external event data 377. For example, an email from the training data 370 may refer to a car bombing in 2008, and the event replacer 325 may replace this event with a reference to an earthquake in 2011. This event would additionally be replaced with the same replacement current event in other related (e.g., linked) decoy documents, such as response emails. Event replacer 325 may additionally replace internal events with false internal events that are included in false internal event data 380. The replacement internal and external events ensure that decoy documents do not refer to old events, which may alert a sophisticated intruder that the decoy documents are not real documents.

Accordingly, decoy documents 390 refer to current external events, as well as to plausible current internal events (meetings etc.). Furthermore, depending on the type of organization being simulated, an appropriate mix of different genres may be used for message topics. Possible genres include information exchange, meeting planning, document collaboration, question and answer, and social conversations.

Bait data inserter 335 generates bait data 342 and inserts it into the decoy documents 390. Examples of bait data 342 include fake credentials, fake social security numbers, fake credit card numbers, source code, trade secrets, and other categories of commonly sensitive or confidential information. Bait data inserter 335 adds such bait data 342 into, for example, decoy emails, decoy IMs, decoy files, decoy web pages (e.g., decoy blogs, etc.). Such bait data increases a lure factor of the decoy documents 390. Note that bait data may not be inserted into all decoy documents.

Decoy documents 390 and decoy inputs 395 included in decoy traffic may be integrally related. In one embodiment, to maintain realism, decoy input generator 385 modifies inputs included in training data that were used to generate the training data to generate decoy inputs. Specifically, decoy input generator 385 may apply changes to inputs in the training data to reflect changes made to the documents in the training data. In one embodiment, changes made to the training data to generate the decoy documents are recorded as deltas. Decoy input generator 385 may then make appropriate changes to the inputs included in the training data based on the delta to generate decoy inputs 395 that correlate to the decoy documents 390. For example, if a training email in the training data 370 included the word fire, and the decoy email 350 generated from that training email instead includes the word apple, the keyboard inputs for the keys "f", "l", "r", "e", would be replaced with decoy inputs that include the keyboard inputs for the keys "a", "p", "p", "l", "e." Therefore, malware that includes a key logger and a document viewer will not detect any discrepancies between the decoy inputs 395 and the decoy documents 390.

In one embodiment, randomizer 332 introduces randomness into generated decoy traffic (e.g., decoy inputs 395 and decoy documents 390). The introduced randomness may include randomness in typing speed, in the timing of sending and/or generating decoy documents, in timing of when SUBs turn on and off VMs, in the current external events chosen for decoy documents, in the generation of internal events, etc. The introduction of randomness further distinguishes the decoy traffic from the real traffic included in the training data 370, and adds to a realism of the decoy traffic. In one embodiment, to introduce randomization into the decoy traffic, a pseudorandom value generator is used. The pseudorandom value generator introduces randomness to add individuality to the scripted behavior of SUBs. The randomness is bounded to ensure that SUBs act within a statistical norm.

In one embodiment, traffic synthesizer 300 includes a decoy email module 310, a decoy document module 320, a decoy instant message (IM) module 330 and a decoy web content module 340. Each module may handle the generation of a different type of decoy document. Each module may include a unique set of rules and/or models for operating on the specific types of decoy traffic that the module is configured to handle. In one embodiment, each module communicates with the temporal data updater 305, event identifier 315, event replacer 325, bait data inserter 335 and/or decoy input generator 385 to generate decoy documents of a specific type.

Decoy email module 310 recycles email threads included in training data 370. Decoy email module 310 controls a dialog structure, participant roles, and social network structure for decoy emails. Decoy email module 310 may also control how emails are released over time and space (e.g., when specific emails are released, and where the emails will be released from). Additionally, decoy email module 310 ensures that the overall traffic pattern and statistical structure of email communications will resemble that of a real communication network. Thus, decoy email module 310 preserves these characteristics from the emails included in the training data. The temporal pattern of messages, including replies to previous messages will therefore resemble that of real email.

Email communication usually happens in conversations (typically called "threads"), in which an initial email is responded to by one or more people. Emails follow one another in a thread in a particular manner: a question is answered, a request acknowledged, etc. Even simple emails with informative content that do not overtly require a follow-up by recipients typically produce at least an acknowledgment response. Also, because of the asynchronous nature of email, email threads often take on the form of a tree.

Emails are not isolated communicative events, but form a dialog (thread) among participants. The participants have roles in their larger organization, which is reflected in the email interactions. The ways in which people participate in email threads reflects the social networks in which they are integrated. For example, a boss may ask subordinates to perform a certain task, who will then report back to him on accomplishment. A subordinate will typically not ask a boss to perform a task. Colleagues at the same level may also ask each other for favors, but the language will reflect the lack of status differential as compared to the boss-subordinate case. Furthermore, individuals are in contact with only a subset of all people in an organization, even if all members of the organization are accessible to them by email. Thus, dialog structure, the organizational role of the email thread participants, and the social network in the agency are closely related.

What this means for the automatic generation of decoy email 350 is that the decoy email module 310 should ensure that the structure of automatically generated email threads is plausible, and does not on its own show its non-human origin. To achieve these goals for decoy email messages, decoy email module 310 will create a thread context so that the decoy email messages do not look isolated and thus fake. This can involve acknowledgements, forwarding the messages to others, or follow-up questions. For new SUBs (with new false identifies), the decoy email module 310 makes sure that the implied social network for those false identities is plausible and is consistent between different uses of these fake users. In one embodiment, decoy email module 310 includes a probabilistic model of email communication that takes into account a social network model for the email senders that are simulated by the SUB and the organizational roles of the email senders. The model will generate patterns of dialog structure in email.

Decoy email module 310 in one embodiment generates email summarizations of email threads included in the corpus of training data 370 based on sentence extraction. The summary may include information about who said what when, and thus provides a sense of the email conversation. Email summaries may provide an analyst with information about a larger collection of emails without attempting to convey all the content. Such indicative summaries can, for example, concentrate on the result of a thread of emails aimed at scheduling a meeting (without tracing the negotiation), or summarize the interaction patterns among a group of email participants over time. In one embodiment, decoy email module 310 identifies the category of an email message and of an entire email thread (e.g., planning, planning-meeting, social chat, technical discussion), and maintains the category for the decoy email 350 that it generates.

Decoy instant messaging (IM) module 330 includes rules similar to those in decoy email module 310 for generating realistic decoy IMs 355 from IMs included in the training data. Similarly, decoy file module 320 includes rules to ensure that decoy files 360 are plausible. For example, decoy file module 320 may include rules for adjusting and/or adding a revision history to a document. However, since decoy files 360 are typically standalone documents, they are typically much easier to generate than decoy emails and/or decoy IMs. Decoy web content module 340 includes rules for decoy web content 345, such as blog posts, wiki posts, etc.

Script generator 342 generates a series of deception scripts 365 to be executed by SUBs. The deception scripts 365 are generated from the decoy documents 390 and the decoy inputs 395. Deception scripts 365 cause SUBs to interact with one another. For example, deception scripts 365 may cause a first SUB to send an email to a second SUB, and may cause the second SUB to send a response email to the first SUB. The structure of the communication between SUBs has a temporal counterpart. Accordingly, the timing of when messages are sent between SUBs can be important. In one embodiment, the SUBs are time synchronized to make such interactions more manageable.

If spikes in communication of decoy documents between SUBs are not correlated with spikes in communication among real users, an intruder could find a way of dividing real from bait message traffic. In one embodiment, script generator 342 adjusts the timing of decoy traffic that will cause network traffic (e.g., caused by interaction between the SUBs) by smoothing out detected communication spikes (e.g., by moving the transmission times for decoy documents forward or back in time). In another embodiment, script generator 342 layers internal events with older external events and newer external events such that when a spike occurs in legitimate traffic, a similar spike occurs in the decoy traffic.

Note that typically the generation of decoy traffic and deception scripts is not a onetime occurrence. Traffic synthesizer 300 may periodically or continuously generate decoy traffic and deception scripts. This ensures that SUBs may generate a constant stream of changing content (traffic). Traffic synthesizer 300 may operate on the same corpus of training data 370 in different ways to generate unique decoy traffic and deception scripts with each iteration of decoy traffic and deception script generation. Alternatively, a new or slightly modified corpus of training data 370 may be used with subsequent iterations of decoy traffic and deception script generation (e.g., based on recently received data from capture and recording modules).

Figure 4:
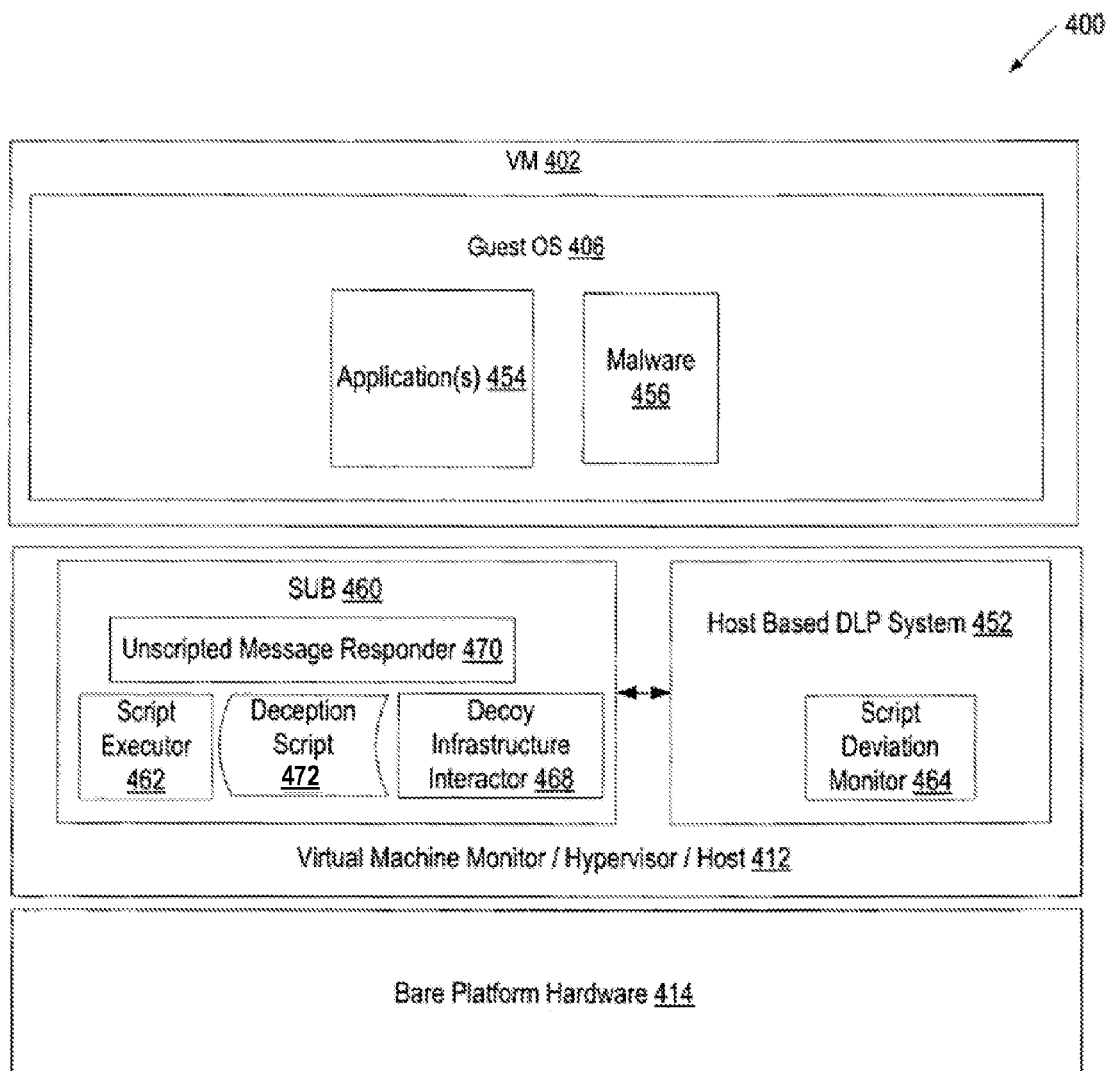
FIG. 4 illustrates a computing device that hosts a virtual machine, in accordance with one embodiment of the present invention.

FIG. 4 illustrates a computing device 400, in accordance with one embodiment of the present invention. The computing device 400 includes bare platform hardware 414, a virtual machine monitor (VMM) 412 and one or more virtual machines 402. The platform hardware 414 can include a processor, memory, input/output (I/O) devices, a storage device, etc.

The VMM (also known as a hypervisor) 412, though typically implemented in software, may emulate and export a bare machine interface to higher level software. Such higher level software may comprise a standard or real-time OS 406, may be a highly stripped down operating environment with limited operating system functionality, may not include traditional OS facilities, etc. In one embodiment, the VMM 412 is run directly on bare platform hardware 414. In another embodiment, the VMM 412 is run on top of a host OS. Alternatively, for example, the VMM 412 may be run within, or on top of, another VMM. VMMs may be implemented, for example, in hardware, software, firmware or by a combination of various techniques. The VMM 412 presents to other software (i.e., "guest" software) the abstraction of one or more virtual machines (VMs), which may provide the same or different abstractions to the various guests.

Each of the virtual machines 402 hosts a guest operating system 406. The guest operating system 406 includes one or more applications 454, such as an email application, a word processing application, a spreadsheet application, and so forth. In addition, the guest OS 406 may include malware 456 that has been covertly installed on the operating system 406. Such malware may include rootkits, malicious bots, key loggers, Trojan horses, viruses, and other spyware.

In one embodiment, VMM 412 includes a surrogate user bot (SUB) 460. The SUB 460 can be a component of the VMM 412, a plugin of the VMM 412, or a separate module within the VMM layer with the same privilege level as the VMM 412. Alternatively, the SUB 460 may run on the guest OS 406, or may be one or more modules running on the guest OS 406 and/or on the VMM 412.

The SUB 460 sends commands and inputs to the VM 402 in a manner that resembles a real user interacting with the VM 402 to generate decoy traffic. The decoy traffic emulates in-host and on-network behavior of real user generated traffic. Accordingly, the SUB 460 emulates in-host behavior in a manner that threats such rootkits, malicious bots, key loggers, and other spyware cannot discern the decoy traffic from real user generated traffic. Accordingly, the surrogate user bot (SUB) 460 appears to the operating system 406 and all applications 454 and malware 456 as if input were coming from a living, breathing, screen watching, keyboard and mouse using human user. This increases the likelihood that the malware 456 will attempt to record and exfiltrate bait data that is released by the SUB 460.

In one embodiment, the SUB 460 includes a script executor 462. The script executor 462 follows a deception script 472 to send decoy inputs through virtualized drivers such as keyboard and mouse drivers. By executing the deception script 472, script executor 462 may open applications 454, search for messages, type responses, surf an intranet, cut and paste information, and perform any other actions that are performed by a real user. All such activity may be monitored and recorded and/or acted upon by malware 456. As decoy inputs are sent to the guest OS 406 by the script executor 462, results may be displayed to virtualized screens and other virtualized devices.

Most commonly, the SUB 460 will have a decoy account since this provides very clean separation of bait information from original information without introducing artifacts of handling bait information and original information differently within a single account. Additionally, some SUBs may share an account with a real user.

In one embodiment, the SUB 460 includes a decoy infrastructure interactor 468. The decoy infrastructure interactor 468 may receive deception scripts from other SUBs and/or from a decoy management system. Therefore, the SUB 460 may continually execute new deception scripts in an ongoing manner. Additionally, the SUB 460 may send incident reports generated by the host based DLP system 452 to other host based DLP systems and/or to a network based DLP system. The communicated deception scripts and incident reports may be encrypted.

In one embodiment, the deception scripts and incident reports are exchanged in a manner to maintain a relatively constant network traffic. Therefore, an intruder may not be alerted when a new incident report identifying that intruder's activity is generated and transmitted on the network. It should be noted that if the technique of using a background of encrypted traffic is employed for either offloading forensic data or simply coordinating scripts, then the scripts and supporting materials may be communicated through a mesh of communications instead of a star-like control communications structure.

It should also be noted that the deception scripts need not be centrally generated. In one embodiment, the functionality of the decoy management system is distributed between multiple hosts. In such an embodiment, local agents on each host can review traffic over periods of time, leverage locally available files, and communicate with each other pair-wise a shorthand of traffic and hashes of larger objects to expect in generating and monitoring the traffic for deviations. For example, each SUB may contain a module for generating a deception script for that SUB. In such an embodiment, the SUB may include some or all functionality described with reference to decoy management system 200.

In one embodiment, multiple SUBs operate in parallel on a host. Each SUB may have a separate decoy account, and may emulate a different fictional person. In one embodiment, the SUB 460 operates on the same VM 402 as a real user. In such an instance, the SUB 460 ensures that generated decoy traffic and bait data are not presented to a real user unless the user begins actively seeking information through inappropriate techniques.

In one embodiment, SUB 460 is configured to share a user account with a real user. In one embodiment, SUB 460 and a human user are never logged in to the shared account at the same time. Additionally, the SUB 460 may remove any evidence that it was using the shared account when it logs out to avoid confusing the human user. Alternatively, SUB 460 may operate while a user is logged in, but only act on background processes and act in a manner that the user does not naturally notice. For example, the SUB 460 may surf the internet for minimized browsers while a real user is logged in, and may return to the browser to the user's last page with history wiped when the user resumes using the browser. Similarly, minimized mail clients could send messages and delete sent messages. In this manner, a large volume of bait information can carefully be made available through a controlled set of likely but inappropriate information gathering techniques expected to be used by threats that collect information within closed networks.

In one embodiment, SUB 460 includes an unscripted message responder 470. Unscripted message responder 470 handles unscripted received messages. Such unscripted received messages are most likely generated by intruders or malware. Upon receipt of an unscripted received message, unscripted message responder 470 analyzes the received message to determine whether a response message is appropriate. For example, unscripted message responder 470 may determine whether the received message includes any questions. If a response message is appropriate, unscripted message responder generates an appropriate message response. The response message will include responses to any questions. For example, if the unscripted message asked, "What do you think about last week's meeting?" the response message may state that it was interesting.

In one embodiment, VMM 412 includes a host based DLP system 452 that manages DLP policies on the VMM 412 and/or on the guest OS 406. The host based DLP system 452 can be a component of the VMM 412, a plugin of the VMM 412, or a separate module within the VMM layer with the same privilege level as the VMM 412. Alternatively, the host based DLP system 452 may run on the guest OS 406, or may be one or more modules running on the guest OS 106 and/or on the VMM 412.

The host based DLP system 452 provides a secure and independent monitoring environment for monitoring the VM 402 that performs actions in accordance with the deception script 472. The host based DLP system 452 may include file system filter drivers (a driver that modifies the behavior of a file system), disk filter drivers, and other components for providing a secure environment. In one embodiment, the host based DLP system 452 includes a script deviation monitor 464 that monitors playback of deception scripts. The script deviation monitor 464 may detect unscripted activity (e.g., unscripted sending of an email message, unscripted access of a storage device, unscripted receipt of a message, etc.). Script deviation monitor 464 may record such unscripted activity, and may generate incident reports detailing the activity.

In one embodiment, host based DLP system 452 additionally detects modifications made to decoy documents, such as by the introduction of a virus to a decoy document. Additionally, host based DLP system 452 may detect the exfiltration of bait data using standard DLP techniques. In one embodiment, the host based DLP system 452 monitors for I/O operations, and determines whether the I/O operation is directed to sensitive data and/or to bait data. The sensitive data and bait data may include, for example, account user names and passwords, credit card numbers, social security numbers, account numbers, employee numbers, driver license numbers, license plate numbers, etc.

In one embodiment, host based DLP system 452 periodically creates snapshots of VM 402 to replicate and test it in a more secure environment. In one embodiment, the host based DLP system 452 sends notifications to a network based DLP system when attempts to access sensitive data are detected.

Note that embodiments of the present invention also work with non-virtual machine systems. For environments where secure virtualization chipsets are not present, kernel level components, file system filter drivers, disk filter drivers and other drivers are used to provide a secure environment for in-host playback and monitoring of deception scripts, and recording of incidents resulting from violations of DLP policies without the use of virtualization.

In one embodiment, a host based DLP system 452 offloads information to a network based DLP system. If this is to be done without alarming an intruder, it should be done without taking the system offline, and without introducing any new traffic that could seem anomalous. Fortunately, the process of shipping scripts between hosts may introduce a background steady-state of encrypted traffic in which it is possible to include encrypted and cryptographically signed forensic logs without shifting the steady state volume of encrypted traffic. Alternatively, data can be encrypted and written to disk in a log signed through tamper-evident and erasure evident techniques.

Figure 5:
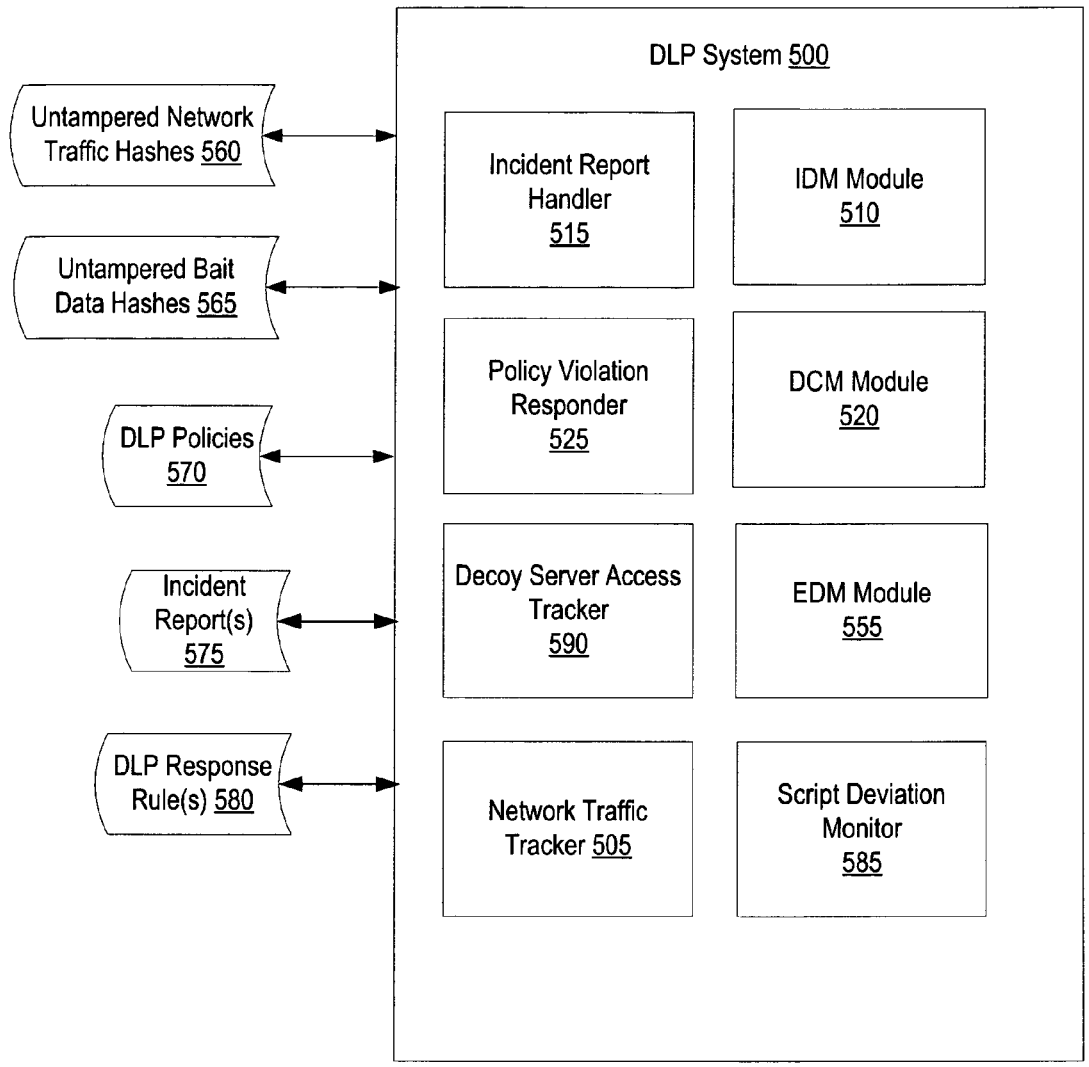
FIG. 5 is a block diagram of a data loss prevention system, in accordance with one embodiment of the present invention.

FIG. 5 is a block diagram of a data loss prevention system 500, in accordance with one embodiment of the present invention. The DLP system 500 may be a host based DLP system (e.g., host based DLP system 115 of FIG. 1) or a network based DLP system (e.g., network based DLP system 132 of FIG. 1). The DLP system 500 may monitor different data loss vectors, applications, data, etc. to detect attempts to move sensitive data and bait data off of an endpoint device and/or off of an enterprise's network. Additionally, the DLP system 500 may monitor traffic to identify deviations in decoy traffic. A network based DLP system may monitor network traffic as it passes through, for example, a firewall. In one embodiment, the DLP system 500 includes an indexed document matching (IDM) module 510, a described content matching (DCM) module 520, an exact data matching (EDM) module 555, an incident report handler 515 and a policy violation responder 525.

DLP system 500 can create fingerprints of decoy documents and bait data. DLP system 500 can then identify when even partial extracts are performed on bait data by using separate hashes for each indexed and normalized cell of data. DLP system 500 may also detect propagation of malicious software between decoy accounts (e.g., to SUBs) within the network, since such propagation would require modifying the pre-scripted traffic between the accounts. Additionally, DLP system 500 can monitor static stores of decoy documents containing bait data for unscripted access. In one embodiment, any induced deviation from scripted behavior is detected. Such detection may indicate that a particular compartment of the network has been compromised. Therefore, once intruders leverage bait data and/or decoy documents, the DLP system 500 can track the decoy documents and bait data as it exits the network and/or an endpoint.

The IDM module 510, DCM module 520 and EDM module 555 each implement a particular data loss prevention technique. The DLP system 500 implements one or more DLP policies 570, which indicate which DLP techniques to use. A DLP policy 570 is violated if one or more criteria included in the DLP policy 570 are satisfied. Examples of criteria include user status (e.g., whether the user has access privileges to a file), file location (e.g., whether a file to be copied is stored in a confidential database), file contents (e.g., whether a file includes sensitive information or bait data), time (e.g., whether an operation is requested during normal business hours), data loss vector, application attempting the operation, and so on.

The DLP policy 570 may include profiles that invoke one or more of the IDM module 510, DCM module 520 or EDM module 555. Each module may identify sensitive data, decoy documents and/or bait data. In one embodiment, the DLP policy 570 includes a DCM profile that invokes the described content matching (DCM) module 520. A DCM profile defines one or more key words and/or regular expressions to be searched for. For example, a profile may define a social security number using a regular expression. Using a DCM profile, DCM module 520 determines whether any information included in scanned data match the key words and/or regular expressions. If a match is found, then it may be determined that the data includes sensitive information or bait information.

In one embodiment, the DLP policy 570 includes an exact data matching (EDM) profile and/or a indexed document matching (IDM) profile that invoke EDM module 555 and/or IDM module 510, respectively. Exact data matching (EDM) may be used for protecting data that is typically in structured formats, such as database records. Indexed document matching (IDM) may be used to protect unstructured data, such as Microsoft® Word or PowerPoint® documents, or CAD drawings. For both EDM and IDM, decoy documents and bait data is first identified to the DLP system 500 (e.g., by a decoy management system). DLP system 500 then fingerprints the decoy documents and bait data for precise, ongoing detection. In one embodiment, the fingerprinting process includes accessing and extracting text and data, normalizing it, and securing it using a nonreversible hash. When a file or other data is to be scanned, a fingerprint (e.g., hash) is generated of that file or contents of that file and compared to stored fingerprints. If a match is found, then the scanned file is identified as containing sensitive data.

Embodiments of the present invention use DLP policies 570 to track bait data and decoy traffic (e.g., decoy documents). The decoy traffic can be entirely or primarily known before it is released onto a network or endpoint. Additionally, the bait data can be controlled. Therefore, the DLP system 500 can leverage extensive information regarding the contents of the bait data and decoy traffic when generating DLP policies. This enables finely tailored DLP policies to be generated that have a very low false positive rate. By virtually eliminating false positives, the ability to both detect threats and to efficiently manage the DLP system 500 can be improved.

Real user generated data has many legitimate uses. Accordingly, DLP rules that are tailored to detect loss of real sensitive data (e.g., data other than bait data) typically primarily detect attempts to exfiltrate the sensitive data. However, a benefit of bait data is that there are no legitimate uses of the bait data (other than operations on the data included in decoy traffic). Accordingly, DLP policies can be configured to detect any type of operation on bait data, such as attempts to intercept, modify, move, exfiltrate, etc. the bait data. This can enable the DLP system 500 to detect a threat much earlier than in a conventional DLP system that operates only on real user generated data. Sophisticated intruders may not actually attempt to exfiltrate sensitive data until after they have been monitoring a system for months. Embodiments of the present invention would detect such careful intruders.

In one embodiment, in which the DLP system 500 is a host based DLP system, DLP system 500 includes a script deviation monitor 585. The script deviation monitor 585 monitors the actions performed on a machine (e.g., a virtual machine or a hardware machine) and compares the actions to actions included in a deception script. The DLP policy 570 may indicate a threshold amount of acceptable deviation from the deception script. Script deviation monitor 585 determines whether the deviations are sufficient to violate the DLP policy 570 (e.g., whether they exceed the deviation threshold).

In one embodiment, DLP system 500 includes a decoy server access tracker 590. Decoy server access tracker 590 tracks access to decoy severs, and determines if the access is scripted. Any unscripted access to a decoy server may be immediately suspect. Accordingly, decoy server access tracker 590 may trigger a DLP response rule after detecting unscripted access to a decoy server.

In one embodiment, in which the DLP system 500 is a network based DLP system, DLP system 500 includes a network traffic tracker 505. Network traffic tracker 505 monitors network traffic sent to and from SUBs. Such network traffic may include emails, IMs, files, etc. sent between SUBs as well as interactions of SUBs with decoy servers. Network traffic tracker 505 compares such detected network traffic with scripted decoy network traffic. The DLP policy 570 may indicate a threshold amount of acceptable deviation from the deceptions scripts. Network traffic tracker 505 determines whether the deviations are sufficient to violate the DLP policy 570.

Policy violation responder 525 applies one or more DLP response rules 580 when a DLP policy violation is detected. Each DLP response rule 580 may be associated with one or more DLP policies 570. Each DLP response rule 580 includes one or more actions for policy violation responder 525 to take in response to violation of an associated DLP policy 570. Once a violation of a DLP policy 570 is discovered, policy violation responder 525 may determine which DLP response rules are associated with the violated DLP policy 570. One or more actions included in the response rule 580 can then be performed. Examples of performed actions include sending a notification to an administrator, preventing the data from exiting an endpoint device through a data loss vector, locking down the computer so that no data can be moved off of the endpoint device through any data loss vector, encrypting data as it is moved off the endpoint device, and so on.

DLP response rules 580 can be triggered by different conditions, including incident severity, incident match count, communications protocol of a message, the endpoint computer's current location (on or off the sub-network), and more. For example, certain incidents, such as bait data from highly sensitive sources could automatically initiate escalated tracking. Additionally, DLP response rules 580 may treat an incident involving 1000 bait records differently than one involving 10 bait records. Thus, DLP system 500 has flexibility in bait trapping and tracking for a variety of threats.

Incident report handler 515 may generate an incident report 575 noting the violated DLP policy 570 and the circumstances surrounding the violated DLP policy 570. Incident report handler 515 maintains a record of incident reports 575 of some or all policy violations that have occurred on an endpoint device and/or that have been attempted by a particular user. In addition to identifying the DLP policy that was violated, each incident report 575 may also indicate the circumstances of the policy violation. For example, the incident report 575 may identify an application, user, data loss vector, type of sensitive data (e.g., social security number, credit card number, etc.), etc. associated with the policy violation. The incident report handler 515 may also include a time stamp showing when the policy violation occurred.

The context of any deviation may be recorded with sufficient detail for confidence in forensic analysis. To ensure capture of such recent histories, incident report handler 515 may record the history into a buffer which eventually overwrites the least recent input. If a high-certainty incident is detected (having a high certainty that is not a false positive), the information may be copied out of the buffer into more persistent storage. Additionally, to preserve a chain of evidence from the moment data is written into the buffer, incident report handler 515 may periodically cryptographically sign the data in the buffer to ensure data integrity. This may be done with overlapping time intervals to ensure continuity of integrity without risk of un-signed events occurring between intervals. In one embodiment, incident report handler 515 receives incident reports from other DLP systems in addition to generating incident reports.

Figure 6:
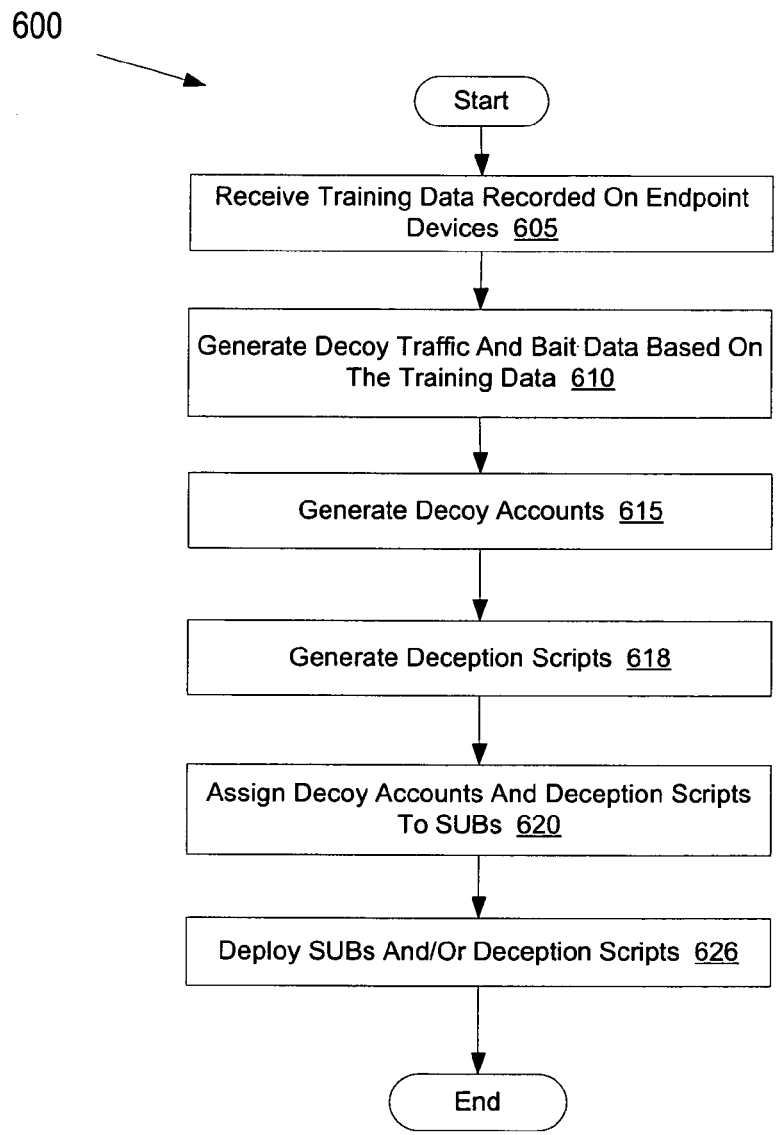
FIG. 6 is a flow diagram of one embodiment of a method for establishing and/or maintaining a decoy infrastructure.

FIG. 6 is a flow diagram of one embodiment of a method 600 for establishing and/or maintaining a decoy infrastructure. The method 600 is performed by processing logic that may comprise hardware (circuitry, dedicated logic, etc.), software (such as is run on a general purpose computer system or a dedicated machine), or a combination of both. Method 600 may be performed by processing logic corresponding to a decoy management system, such as decoy management system 200 of FIG. 2. Additionally, method 600 may be performed by SUBs or by a combination of SUBs and a decoy management system.

Referring to FIG. 6, at block 605 processing logic receives training data that has been recorded on endpoint devices. In one embodiment, each endpoint device includes a module that records the training data. Recording training data may include recording all inputs into the endpoint device and/or all outputs from the endpoint device. For example, the modules may record keyboard inputs, mouse inputs, commands to launch applications, commands to send emails, etc.

At block 610, processing logic generates decoy traffic and bait data based on the training data. In one embodiment, processing logic uses machine learning techniques to modify real user traffic included in the training data to form the decoy traffic. Processing logic may also generate bait data (e.g., false credentials, social security numbers, credit card numbers, etc.) and insert the bait data into the decoy traffic. In one embodiment, processing logic performs method 700 to generate the decoy traffic.

At block 615, processing logic generates decoy accounts. At block 618, processing logic generates deception scripts based on the decoy traffic. The deceptions scripts, when executed by SUBs, will cause the SUBs to recreate and release the decoy traffic. At block 620, processing logic assigns the decoy accounts and the deception scripts to the SUBs. Therefore, each SUB may emulate a fictional user having the assigned decoy account by executing the assigned deception script.

At block 626, processing logic deploys the SUBs and/or the deception scripts to endpoint devices. An SUB and a deception script may be packaged together into a single file, and sent to an endpoint. Alternatively, a deception script may be sent to an already deployed SUB. Additionally, a configuration file may be sent to a deployed SUB along with a deception script. The configuration file may reconfigure the SUB to cause the SUB to assume a new role (e.g., of a new false person).

Figure 7:
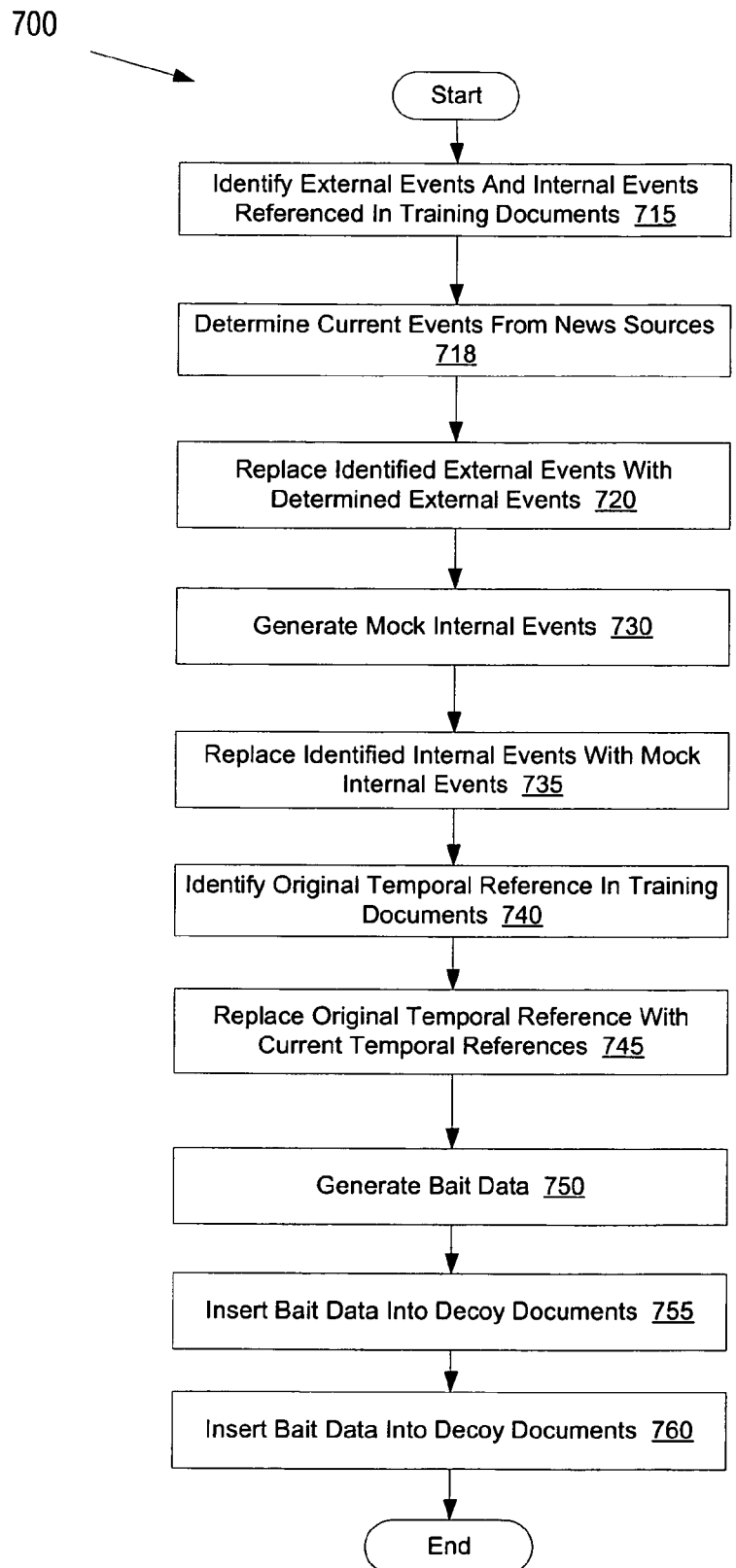
FIG. 7 is a flow diagram of one embodiment of a method for generating decoy traffic.

FIG. 7 is a flow diagram of one embodiment of a method 700 for generating decoy traffic. The method 700 is performed by processing logic that may comprise hardware (circuitry, dedicated logic, etc.), software (such as is run on a general purpose computer system or a dedicated machine), or a combination of both. Method 700 may be performed by a processing logic corresponding to a decoy management system, such as decoy management system 200 of FIG. 2. Alternatively, method 700 may be performed by processing logic corresponding to an SUB.

Referring to FIG. 7, at block 715 processing logic identifies external events and internal events referenced in the training documents. The training documents may include training emails, training IMs, training files, training web postings, and so forth. Examples of internal events include company meetings, product releases, etc. Examples of external events include natural disasters, wars, etc. Processing logic may use contextual information such as language surrounding discussion of the identified event to distinguish the event as an internal event or as an external event.

At block 718, processing logic determines current external events from external news sources. At block 720, processing logic replaces the identified external events with the determined current external events.

At block 730, processing logic generates mock internal events (e.g., fake meetings). At block 735, processing logic replaces the identified internal events referenced in the training documents with the mock internal events.

At block 740, processing logic identifies original temporal references in training documents. The temporal references may include absolute temporal references (e.g., specific dates and times) as well as relative temporal references (e.g., tomorrow, next week, yesterday, the other day, etc.). At block 745, processing logic determines appropriate current temporal references and replaces the original temporal references with the current temporal references.

At block 750, processing logic generates bait data. The bait data may be generated from the training data, or from a separate corpus of training data. At block 755, processing logic inserts the bait data into the decoy documents.

At block 760, processing logic generates decoy inputs. The decoy inputs may be generated based on a delta between training documents and decoy documents, and based on inputs included in the training data. The delta may be used to adjust the inputs in the training data to generate decoy inputs that correlate to the decoy documents. The method then ends.

Method 700 generates a complete corpus of decoy traffic, including decoy documents and decoy inputs.

Figure 8:
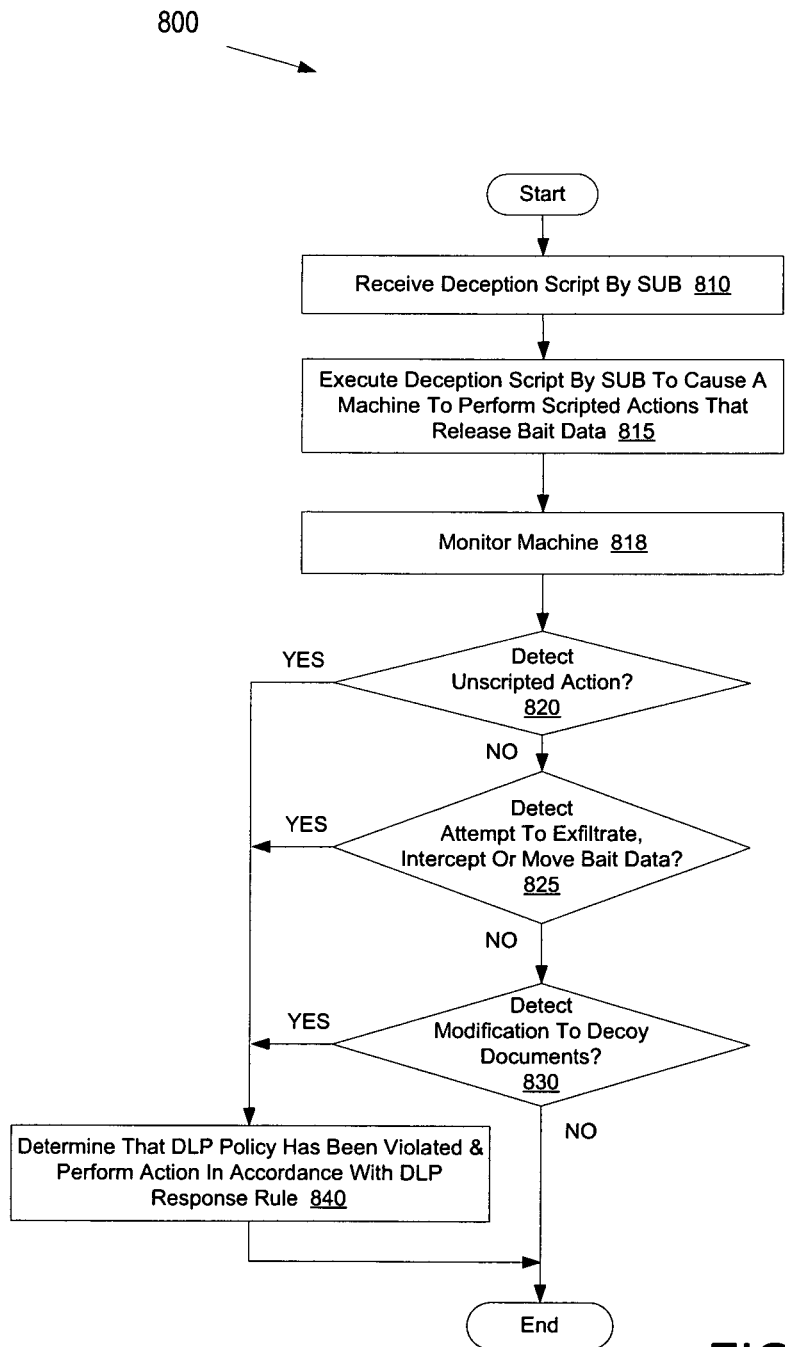
FIG. 8 is a flow diagram of one embodiment of a method for detecting threats using DLP and decoy traffic.

FIG. 8 is a flow diagram of one embodiment of a method 800 for detecting threats using DLP and decoy traffic. The method 800 is performed by processing logic that may comprise hardware (circuitry, dedicated logic, etc.), software (such as is run on a general purpose computer system or a dedicated machine), or a combination of both. Method 800 may be performed by a host executing a host based DLP system and/or a SUB, such as those discussed with reference to the preceding figures.

Referring to FIG. 8, at block 810 processing logic receives a deception script. Prior to receiving the deception script, an automated installation script may install an SUB on a host that hosts the processing logic. The automated installation script may additionally install a host based DLP system on the host.

At block 815, processing logic executes the deception script to cause a virtual machine to perform scripted actions that release bait data. Alternatively, processing logic may execute the deception script to cause a hardware machine to perform the scripted actions. The scripted actions may include providing mouse inputs, providing keyboard inputs, typing a paper, sending an email message, and so forth.

At block 818, processing logic monitors the machine to detect violations of DLP policies. At block 820, processing logic determines whether an unscripted action is detected. An unscripted action may include an unscripted access to a decoy file, an unscripted transfer of data off of the endpoint (e.g., via ftp, email, IM, etc.), unscripted access of a decoy server, etc. If an unscripted action is detected, the method continues to block 840. If no unscripted action is detected, the method proceeds to block 825.

At block 825, processing logic determines whether an attempt to exfiltrate, intercept or move the bait data is detected. The attempt to exfiltrate the bait data may include an attempt to send the bait data off of the endpoint. In some instances, such attempts may be made using scripted actions. For example, malware may attempt to attach bait data to scripted email messages. If an attempt to exfiltrate bait data is detected, the method continues to block 840. Otherwise, the method proceeds to block 830.

At block 830, processing logic determines whether any modifications have been made to decoy documents. For example, processing logic may detect whether a decoy file has been modified (e.g., by being infected by a virus). If processing logic detects a modification to a decoy document, the method continues to block 840. Otherwise, the method ends.

At block 840, processing logic determines that a DLP policy has been violated, and performs one or more actions in accordance with a DLP response rule. Processing logic may generate an incident report, flag the endpoint device as being compromised, enable additional (e.g., more stringent) DLP policies, notify an administrator, etc.

Figure 9:
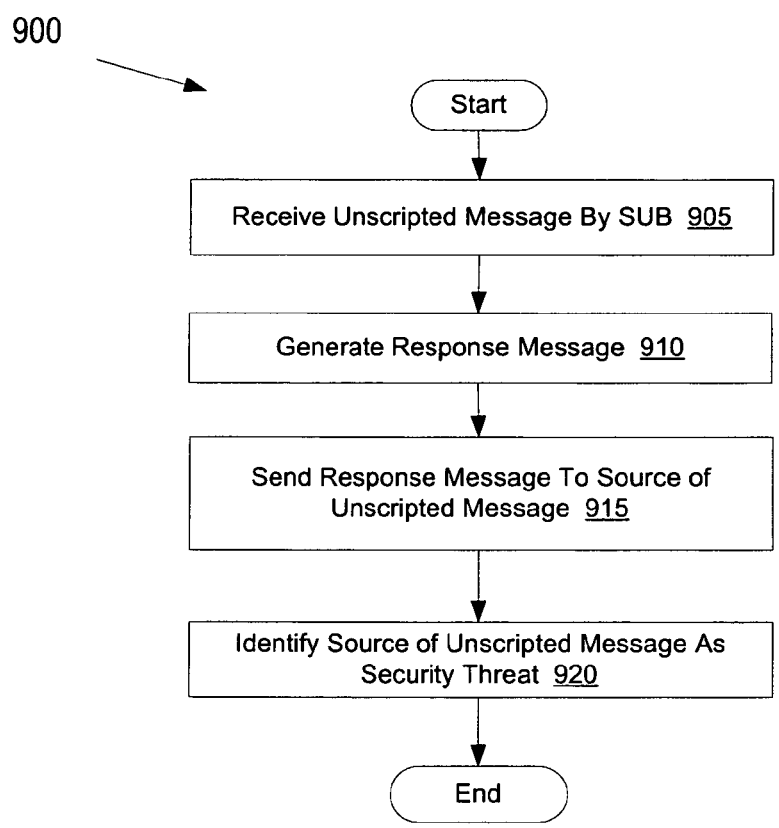
FIG. 9 is a flow diagram of one embodiment of a method for responding to unscripted messages by a surrogate user bot.

FIG. 9 is a flow diagram of one embodiment of a method 900 for responding to unscripted messages by a surrogate user bot. The method 900 is performed by processing logic that may comprise hardware (circuitry, dedicated logic, etc.), software (such as is run on a general purpose computer system or a dedicated machine), or a combination of both. Method 900 may be performed by a surrogate user bot, such as SUB 460 of FIG. 4.

Referring to FIG. 9, at block 905 processing logic receives an unscripted message. At block 910, processing logic generates a response message. At block 915, processing logic sends the response message to a source of the unscripted message. At block 920, processing logic identifies the source of the unscripted message as a security threat. Since legitimate users will not have any knowledge of the SUB, only users and malware that have monitored the network using illegitimate means will be aware of the SUB. Therefore, unscripted traffic sent to an SUB is immediately suspect.

Figure 10:
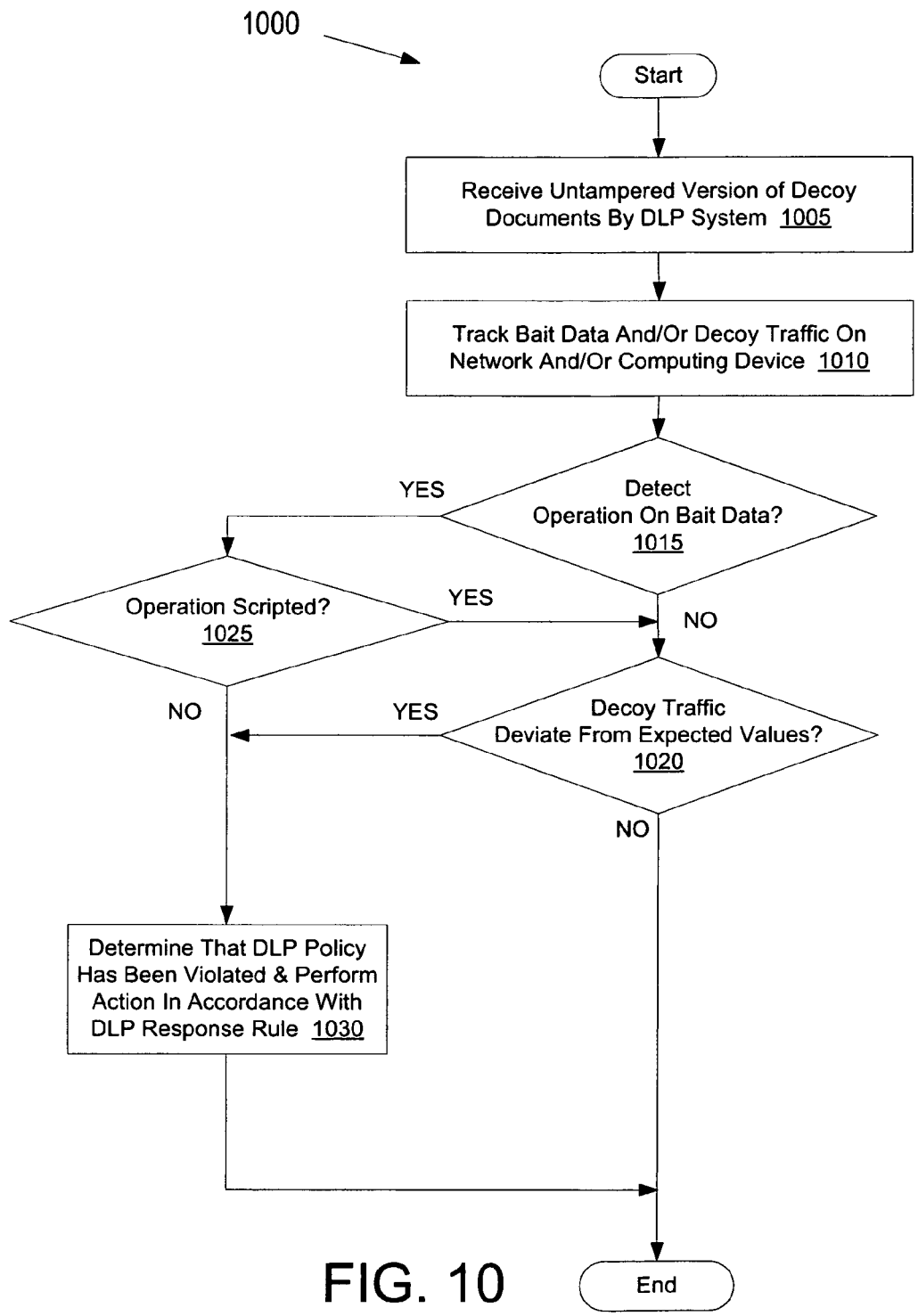
FIG. 10 is a flow diagram of another embodiment of a method for detecting threats using DLP and decoy traffic.

FIG. 10 is a flow diagram of another embodiment of a method 1000 for detecting threats using DLP and decoy traffic. The method 1000 is performed by processing logic that may comprise hardware (circuitry, dedicated logic, etc.), software (such as is run on a general purpose computer system or a dedicated machine), or a combination of both. Method 1000 may be performed by a network based DLP system, such as network based DLP system 132 of FIG. 1.

Referring to FIG. 10, at block 1005 processing logic receives an untampered version of decoy traffic. This may include untampered bait data and decoy documents. In one embodiment, processing logic receives deception scripts for all of the SUBs that are operating on the network. Processing logic may generate one or more fingerprints of the untampered bait data and/or decoy documents.

At block 1010, processing logic tracks bait data and/or decoy traffic on the network. This may include comparing detected network traffic to scripted decoy traffic. Additionally, this may include fingerprinting the contents of detected network traffic and comparing to pregenerated fingerprints (e.g., using EDM or IDM DLP techniques).

At block 1015, processing logic determines whether an operation on bait data is detected. The detected operation may include, for example, an attempt to exfiltrate the bait data, an attempt to move the bait data, an attempt to intercept the bait data, or any other type of action associated with the bait data. Such operations on bait data may be detected by tracking the bait data using DLP policies that include one or more rules for performing IDM, EDM or DCM on data that is at rest or in transit on a network or on a server or endpoint. If an operation on bait data is detected, the method continues to block 1025. Otherwise, the method proceeds to block 1020.

At block 1020, processing logic determines whether detected decoy traffic deviates from expected values. This may be performed by comparing fingerprints of detected traffic and its contents (e.g., network traffic and/or traffic on a computing device) to fingerprints generated from the contents of received deception scripts. If processing logic detects a modification to a decoy document, the method continues to block 1030. Otherwise, the method proceeds to block 1025.

At block 1025, processing logic determines whether the detected operation on the bait data is a scripted action. This may be determined by comparing the detected action to one or more deception scripts or to a schedule of scripted traffic that is based on the deception scripts. If the detected action is not on the schedule, then it may be categorized as an unscripted action. If an unscripted action is detected, the method continues to block 1030. If no unscripted action is detected, the method continues to block 1020.

At block 1030, processing logic determines that a DLP policy has been violated, and performs one or more actions in accordance with a DLP response rule. Processing logic may generate an incident report, flag the endpoint device as being compromised, enable additional (e.g., more stringent) DLP policies, notify an administrator, etc.

Figure 11:
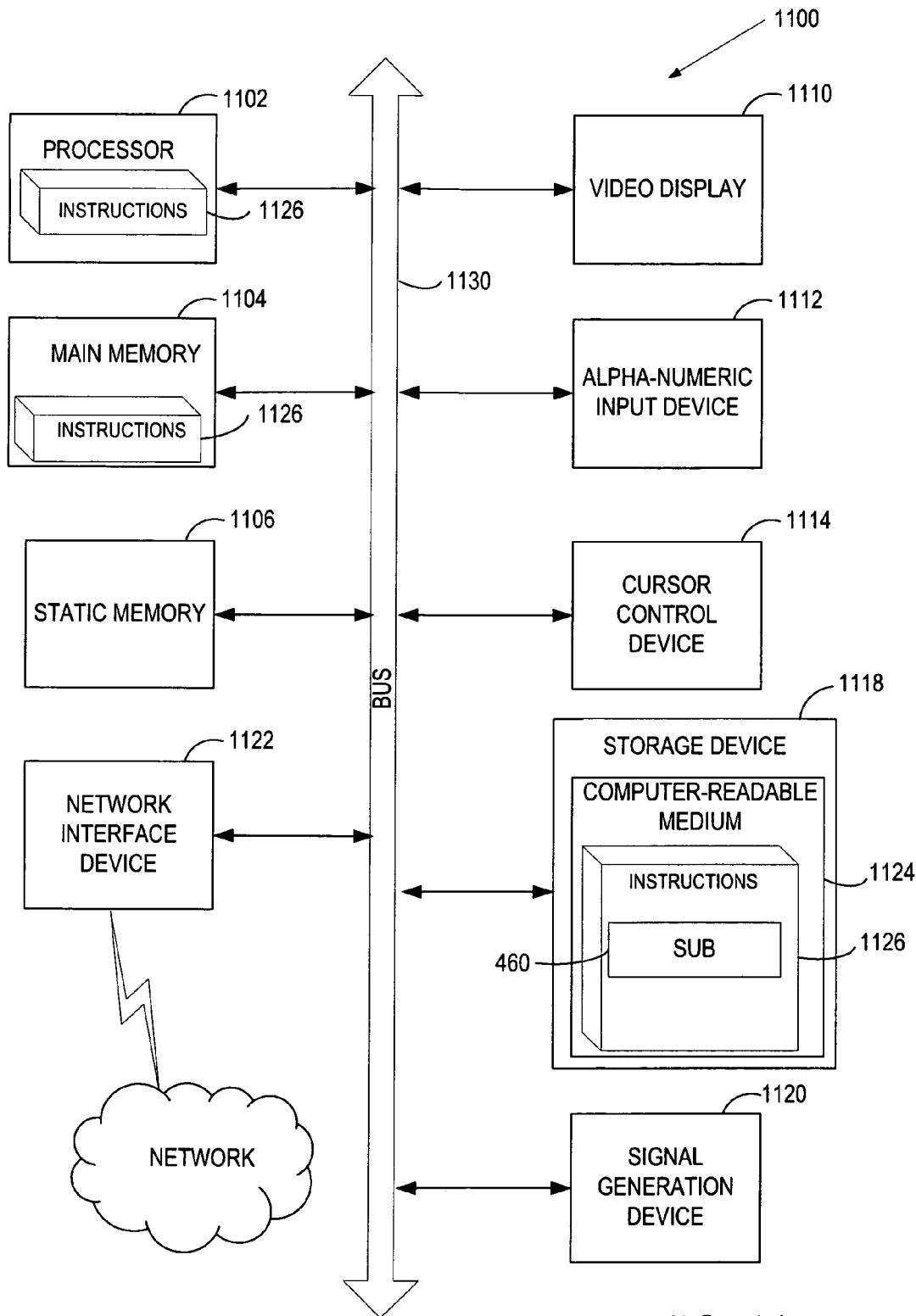
FIG. 11 is a block diagram of an exemplary computer system that may perform one or more of the operations described herein.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1102 may also be one or more special-purpose processing devices such as an application specific integrated circuit (ASIC), a field programmable gate array (FPGA), a digital signal processor (DSP), network processor, or the like. The processor 1102 is configured to execute instructions 1126 for performing the operations and steps discussed herein.

The computer system 1100 may further include a network interface device 1122. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The data storage device 1118 may include a computer-readable storage medium 1124 on which is stored one or more sets of instructions 1126 (e.g., software) embodying any one or more of the methodologies or functions described herein. The instructions 1126 may also reside, completely or at least partially, within the main memory 1104 and/or within the processor 1102 during execution thereof by the computer system 1100, the main memory 1104 and the processor 1102 also constituting computer-readable storage media. The instructions 1126 may further be transmitted or received over a network 1174 via the network interface device 1122.

In one embodiment, the instructions 1126 include instructions for a SUB, such as SUB 460 of FIG. 4, and or a software library containing methods that call a SUB. Alternatively, or in addition, instructions 1126 may include instructions for a host based DLP system (e.g., host based DLP system 452), for a network based DLP system (e.g., network based DLP system 132), and/or for a decoy management server (e.g., decoy management server 200). While the computer-readable storage medium 1124 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

While the computer-readable storage medium may be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description.

What is claimed is:

1. A computer-implemented method comprising:
    tracking, by a hardware processing device executing a data loss prevention (DLP) system, initial bait data on at least one of a host computing device or a network to which the host computing device is connected, wherein the initial bait data is generated from training data, and wherein the initial bait data comprises at least a modified portion of the training data that is related to the initial bait data;
    identifying one or more properties of the initial bait data within one or more incident reports for a potential security threat;
    generating, from the training data, additional bait data that has the one or more properties of the initial bait data in response to detecting unscripted activity associated with the initial bait data committed by the potential security threat, wherein the additional bait data comprises at least a modified portion of the training data that is related to the additional bait data, and wherein the initial bait data and the additional bait data comprise at least one of decoy stored data or decoy input data; and
    making the additional bait data available to the potential security threat.

2. The computer-implemented method of claim 1, wherein detecting the unscripted activity comprises:
    detecting at least one of an attempt to exfiltrate the initial bait data or an attempt to intercept the initial bait data.

3. The computer-implemented method of claim 1, wherein detecting the unscripted activity comprises:
    tracking network traffic that includes the initial bait data; and
    determining that at least one of the network traffic or the initial bait data deviates from expected values.

4. The computer-implemented method of claim 1, wherein detecting the unscripted activity comprises:

generating a fingerprint of at least a portion of the initial bait data;
comparing the fingerprint to a plurality of previously generated fingerprints; and
determining that the fingerprint matches one of the plurality of previously generated fingerprints.

5. The computer-implemented method of claim 1, wherein detecting the unscripted activity comprises:
detecting an operation on the initial bait data using at least one of exact data matching, indexed document matching, or described content matching; and
determining that the detected operation is an unscripted operation.

6. The computer-implemented method of claim 3, wherein the network traffic includes decoy network traffic that is generated by a plurality of endpoints on the network in accordance with one or more deception scripts, and wherein detecting the unscripted activity comprises detecting the unscripted activity in at least one of the decoy network traffic or the initial bait data to or from at least one of the endpoints.

7. A non-transitory computer readable storage medium including instructions that, when executed by a hardware processing device, cause the processing device to perform operations comprising:
tracking, by the hardware processing device executing a data loss prevention (DLP) system, initial bait data on at least one of a host computing device or a network to which the host computing device is connected, wherein the initial bait data is generated from training data, and wherein the initial bait data comprises at least a modified portion of the training data that is related to the initial bait data;
identifying one or more properties of the initial bait data within one or more incident reports for a potential security threat;
generating, from the training data, additional bait data that has the one or more properties of the initial bait data in response to detecting unscripted activity associated with the initial bait data committed by the potential security threat, wherein the additional bait data comprises at least a modified portion of the training data that is related to the additional bait data, and wherein the initial bait data and the additional bait data comprise at least one of decoy stored data or decoy input data; and
making the additional bait data available to the potential security threat.

8. The non-transitory computer readable storage medium of claim 7, wherein detecting the unscripted activity comprises:
detecting at least one of an attempt to exfiltrate the initial bait data or an attempt to intercept the initial bait data.

9. The non-transitory computer readable storage medium of claim 7, wherein detecting the unscripted activity comprises:
tracking network traffic that includes the initial bait data; and
determining that at least one of the network traffic or the initial bait data deviates from expected values.

10. The non-transitory computer readable storage medium of claim 7, wherein detecting the unscripted activity comprises:
generating a fingerprint of at least a portion of the initial bait data;
comparing the fingerprint to a plurality of previously generated fingerprints; and
determining that the fingerprint matches one of the plurality of previously generated fingerprints.

11. The non-transitory computer readable storage medium of claim 7, wherein detecting the unscripted activity comprises:
detecting an operation on the initial bait data using at least one of exact data matching, indexed document matching, or described content matching; and
determining that the detected operation is an unscripted operation.

12. The non-transitory computer readable storage medium 9, wherein the network traffic includes decoy network traffic that is generated by a plurality of endpoints on the network in accordance with one or more deception scripts, and wherein detecting the unscripted activity comprises detecting the unscripted activity in at least one of the decoy network traffic or the initial bait data to or from at least one of the endpoints.

13. A computing device comprising:
a memory to store instructions for a data loss prevention (DLP) system; and
a hardware processing device, connected to the memory, to execute the instructions to:
track initial bait data on at least one of a host computing device or a network to which the host computing device is connected, wherein the initial bait data is generated from training data, and wherein the initial bait data comprises at least a modified portion of the training data that is related to the initial bait data;
identify one or more properties of the initial bait data within one or more incident reports for a potential security threat;
generate, from the training data, additional bait data that has the one or more properties of the initial bait data in response to detecting unscripted activity associated with the initial bait data committed by the potential security threat, wherein the additional bait data comprises at least a modified portion of the training data that is related to the additional bait data, and wherein the initial bait data and the additional bait data comprise at least one of decoy stored data or decoy input data; and
make the additional bait data available to the potential security threat.

14. The computing device of claim 13, wherein detecting the unscripted activity comprises:
detecting at least one of an attempt to exfiltrate the initial bait data or an attempt to intercept the initial bait data.

15. The computing device of claim 13, wherein detecting the unscripted activity comprises:
tracking network traffic that includes the initial bait data; and
determining that at least one of the network traffic or the initial bait data deviates from expected values.

16. The computing device of claim 15, wherein the network traffic includes decoy network traffic that is generated by a plurality of endpoints on the network in accordance with one or more deception scripts.

17. The computing device of claim 13, wherein detecting the unscripted activity comprises:
generating a fingerprint of at least a portion of the initial bait data;
comparing the fingerprint to a plurality of previously generated fingerprints; and
determining that the fingerprint matches one of the plurality of previously generated fingerprints.

18. The computing device of claim 16, wherein detecting the unscripted activity comprises:

detecting the unscripted activity in at least one of the decoy network traffic or the initial bait data to or from at least one of the endpoints.

19. The computing device of claim 13, wherein detecting the unscripted activity comprises:

detecting an operation on the initial bait data using at least one of exact data matching, indexed document matching, or described content matching; and determining that the detected operation is an unscripted operation.

* * * * *